US009415834B2

(12) United States Patent
Braedt

(10) Patent No.: US 9,415,834 B2
(45) Date of Patent: Aug. 16, 2016

(54) MULTIPLE SPROCKET ASSEMBLY FOR A BICYCLE GEARING AS WELL AS REAR AXLE ARRANGEMENT WITH A MULTIPLE SPROCKET ASSEMBLY OF THIS TYPE

(75) Inventor: Henrik Braedt, Gerbrunn (DE)

(73) Assignee: SRAM Deutschland GmbH, Schweinfurt (DE)

( * ) Notice: Subject to any disclaimer, the term of this patent is extended or adjusted under 35 U.S.C. 154(b) by 642 days.

(21) Appl. No.: 13/488,082

(22) Filed: Jun. 4, 2012

(65) Prior Publication Data

US 2012/0309572 A1 Dec. 6, 2012

(30) Foreign Application Priority Data

Jun. 3, 2011 (DE) .......................... 10 2011 103 489

(51) Int. Cl.
*B62M 9/10* (2006.01)
*F16H 55/30* (2006.01)

(52) U.S. Cl.
CPC ....................................... *B62M 9/10* (2013.01)

(58) Field of Classification Search
USPC .................................................. 474/160, 164
See application file for complete search history.

(56) References Cited

U.S. PATENT DOCUMENTS

| 4,380,445 | A  | * | 4/1983  | Shimano ........................ 474/144 |
|-----------|----|---|---------|------------------------------------------|
| 6,102,821 | A  | * | 8/2000  | Nakamura ..................... 474/160    |
| 6,488,603 | B2 | * | 12/2002 | Lim et al. ...................... 474/160 |
| 7,959,529 | B2 | * | 6/2011  | Braedt ........................... 474/160 |
| 8,821,330 | B2 | * | 9/2014  | Dal Pra' et al. ............... 474/160   |
| 2005/0009654 | A1 | * | 1/2005 | Kanehisa et al. ............. 474/152 |
| 2005/0272546 | A1 | * | 12/2005 | Reiter ........................ 474/152 |
| 2006/0014599 | A1 | * | 1/2006 | Meggiolan .................... 474/152 |
| 2008/0004143 | A1 | * | 1/2008 | Kanehisa et al. ............. 474/160 |
| 2008/0234082 | A1 | * | 9/2008 | Braedt ......................... 474/116 |
| 2009/0042679 | A1 | * | 2/2009 | Valle ........................... 474/152 |
| 2009/0042682 | A1 | * | 2/2009 | Dal Pra' et al. ............... 474/160 |
| 2009/0215566 | A1 | * | 8/2009 | Braedt ......................... 474/160 |
| 2009/0243250 | A1 | * | 10/2009 | Chiang ........................ 280/260 |
| 2010/0004081 | A1 | * | 1/2010 | Braedt ......................... 474/160 |
| 2010/0075791 | A1 | * | 3/2010 | Braedt ......................... 474/160 |
| 2011/0105263 | A1 | * | 5/2011 | Braedt ......................... 474/160 |
| 2012/0244976 | A1 | * | 9/2012 | Lin ............................. 474/160 |
| 2012/0302384 | A1 | * | 11/2012 | Braedt ........................ 474/160 |
| 2012/0309572 | A1 | * | 12/2012 | Braedt ........................ 474/160 |

FOREIGN PATENT DOCUMENTS

DE   202008005971   7/2008
GB   2289507        11/1995

* cited by examiner

*Primary Examiner* — William E Dondero
*Assistant Examiner* — Mark K Buse
(74) *Attorney, Agent, or Firm* — Milan Milosevic; Lisa Serdynski

(57) ABSTRACT

The invention relates to a multiple sprocket assembly with a plurality of sprockets with different numbers of teeth for assembly on a rear axle of a bicycle, comprising a base body, on which at least a part of the plurality of sprockets is provided, as well as a support ring that is connected to or can be connected to the base body in a torque-transmitting manner. It is further provided thereby that the base body and the support ring are configured on their radially inner region respectively with a radial inner bearing section for rotatable bearing on a rear axle of the bicycle and that the support ring has at least one torque transmission section configured separately from the bearing section for transmitting a torque from the multiple sprocket assembly to a hub body.

18 Claims, 6 Drawing Sheets

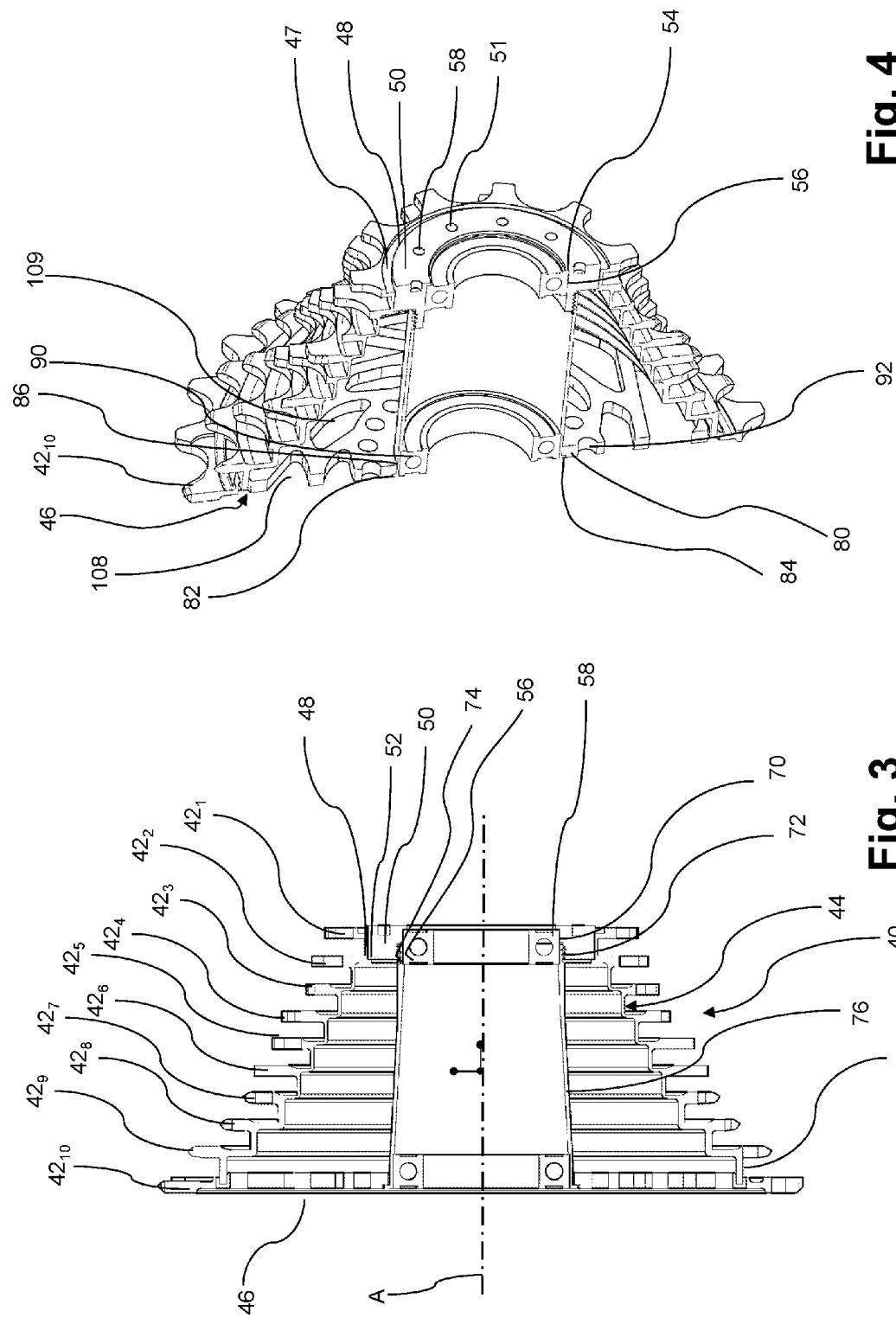

MULTIPLE SPROCKET ASSEMBLY FOR A BICYCLE GEARING AS WELL AS REAR AXLE ARRANGEMENT WITH A MULTIPLE SPROCKET ASSEMBLY OF THIS TYPE

BACKGROUND OF THE INVENTION

The present invention relates to a multiple sprocket assembly with a plurality of sprockets with different numbers of teeth for assembly on a rear axle of a bicycle, comprising a base body, on which at least a part of the plurality of sprockets is provided, and a support ring that is connected to or can be connected to the base body in a torque-transmitting manner. Furthermore, the present invention relates to a rear axle assembly for a bicycle with a multiple sprocket assembly of this type.

Various systems are known in the prior art for the attachment of multiple sprocket assemblies for bicycle gears on rear axles. In a widespread system, a driver is supported in a rotatable manner on the rear axle of a bicycle via a bearing arrangement. The driver is in torque-transmitting engagement with the hub shell via a one-way clutch and permits a torque transmission in the one direction of rotation (drive direction), whereas it is uncoupled from the hub shell with respect to rotation in the other direction in order to provide a free-wheel. Usually a driver of this type is provided on its outer circumferential surface with keyways or splines or a comparable profile, in order to be able to attach hereto individual sprockets or an assembly composed of several sprockets in a torque-transmitting manner. A solution of this type is shown in the prior art, for example, in DE 199 15 436 A1. Comparable solutions are further shown in documents JP 59-165293, GB 2 177 628 A or EP 0 277 576 A2.

Although this system is very widespread, it is increasingly reaching its limits and has disadvantages. For instance, particularly with sophisticated bicycle gear systems, such as are now used in professional bicycle racing as well as for recreational cyclists, the number of sprockets is constantly increasing. This is in part due to relatively large gear ratios being offered but in particular also relatively narrow graduations are used in order, for example, to render possible an optimal gear ratio when cycling over flat terrain or when cycling in a group with a constant pedaling rate. In both cases, i.e., when narrow graduations are provided with small gear ratio transfers or when large gear ratio steps are to be provided, there is an increasing need for smaller sprockets, i.e., sprockets with 10 teeth or less. Such small sprockets, however, can no longer be mounted on a driver of the conventional type, so that auxiliary constructions are necessary, which usually require additional parts and therefore have a complicated structure or are difficult to install.

Furthermore, the classic driver solution entails a further basic problem with respect to the power flow. It must namely be taken into consideration that the sprocket respectively wound about by the drive chain during the drive is exposed to strong transverse forces, which act along the chain. These transverse forces have to be absorbed via the bearing of the driver by the rear axle. In the known solution, the transverse forces have to be transmitted to the driver and by the driver via the bearing arrangement to the rear axle. At the same time, however, the torque must also be transmitted to the driver. This means that the transverse forces due to the chain force as well as the drive torque have to be transmitted via one and the same "interface" between the sprocket or sprocket set and driver. This interface is usually the splines embodied on the outer circumferential surface of the driver. It has been shown that this is associated with disadvantages, because due to the transverse forces occurring, a strain on the individual sprockets occurs, which then can have a negative effect on the torque transmission.

In the prior art it has already been recognized that—despite its widespread use—the conventional solution with a separately embodied driver, on which then individual sprockets or a set of sprockets are or is attached, is associated with disadvantages. For this reason alternatives have been sought.

For instance, document DE 20 2008 005 971 shows an arrangement in which a sprocket set is embodied in one piece with a pipe element. The pipe element for its part is used for bearing on the rear axle and has a functional section, on which the torque transmission takes place via the free wheel arrangement on the hub shell. Although this solution may have advantages regarding the bearing of the sprocket set, it has the fundamental problem that the force flow from the largest sprocket runs through the entire sprocket set to the smallest sprocket and from this through the pipe to the one-way clutch. This means that the entire sprocket set, in particular also the small sprockets, have to be embodied in a relatively solid manner in order to be able to durably withstand this power flow. The bearing tube inside the sprocket set must also be embodied in a correspondingly solid manner. The result of this is that the solution has to be embodied in a relatively solid manner and thus with a large weight.

Document DE 10 2009 006 101 A1 also tries to circumvent the conventional solution of a separate externally toothed driver. In this solution in turn a basic sprocket set with a relatively large number of sprockets is provided, which has to be embodied in a correspondingly solid manner for power transmission. In addition, a supplementary sprocket set can be screwed onto this base sprocket set. However, again it is shown that the entire power flow in particular from the heavily loaded sprockets with a large diameter, runs through a relatively long section of the sprocket set, so that the entire sprocket set has to be embodied in a correspondingly solid manner including in the region of smaller sprockets, which leads to the problems already mentioned above of a large total weight of the arrangement. Furthermore, it is not discernible with this solution that in fact the problem of accommodating very small sprockets has been taken into account. Also the additional sprocket set, which has rather smaller sprockets and is screwed onto the basic sprocket set, is embodied such that it is embodied radially outside a pipe section of the basic sprocket set. Thus a similar situation results as with a conventional driver.

Finally, document FR 896 001 shows an assembled sprocket arrangement that is composed of a plurality of individual parts. Basically this arrangement however again follows the idea of providing in particular the smaller sprockets on a type of driver, which is an obstacle as far as the dimensioning thereof with few teeth is concerned.

SUMMARY OF THE INVENTION

It is an object of the present invention to provide a multiple sprocket assembly of the type mentioned at the outset and a rear axle arrangement embodied herewith, which takes into account the problems described above and which solves the problems known with conventional systems with respect to power flow.

This object is attained by a multiple sprocket assembly of the type mentioned at the outset, with which it is provided that the base body and the support ring are provided on their radially inner region respectively with a radial inner bearing section for rotatable bearing on a rear axle of the bicycle and that the support ring has at least one torque transmitting section configured, in addition to, i.e., separate from, the bearing section, for transmitting a torque from the multiple sprocket assembly to a hub body of the rear wheel through a one-way clutch.

According to the invention, the base body is supported directly, without interposition of a driver on the rear axle of the bicycle. Various bearing arrangements can be used for this purpose, for example, antifriction bearings or also friction bearings, as long as the latter are of sufficiently high quality. It is thereby possible to embody considerably smaller sprockets on the base body with correspondingly small numbers of teeth than with the prior art, in which the driver is provided radially inside the sprocket set or radially inside individual sprockets to receive the respective sprockets. In this respect, the invention already takes into account the requirement for small sprockets with a low number of teeth.

Furthermore, the invention has the further advantage that the power flow is optimized. The transverse forces that are transmitted to the respective sprocket in engagement with the drive chain can be transmitted directly and divided to the two bearing sections of base body and support ring, respectively, to the rear axle. This transverse force transmission and the assigned power flow are independent of the torque transmission from the base body or the support ring to the hub body. In other words, the interface for the transverse force transmission is embodied in a spatially separate manner from the interface for torque transmission, which has considerable advantages. Deformations of individual sprockets due to the transverse force applied due to the chain are thus irrelevant for the torque transmission. In particular it is possible minimize strains due to transverse forces from occurring in the interface to the one-way clutch or directly in the one-way clutch. The interface between the multiple sprocket assembly and the hub body for torque transmission can thus be optimized specifically and solely for this torque transmission, and in this optimization it does not need to be taken into consideration that corresponding transverse forces occur. In other words, the torque transmission section, which is embodied separately from the bearing section, can be optimized for the torque transmission from the multiple sprocket assembly to the hub body of the rear wheel. This also has advantages in terms of saving weight.

According to a further development of the invention it can be provided that the torque transmission section is arranged radially outside the bearing section. It is thus possible to arrange the torque transmission section in a region that is better suited for torque transmission than the region of a driver lying radially relatively far inside according to the prior art. It is to be taken into consideration thereby that due to the small lever arms the forces occurring are greater the closer the torque transmission section is to the rotation axis. This understanding can be utilized by the present invention in that the torque transmission section is arranged in a region radially outside the bearing section, that is, further outside than in the prior art, in order thus to keep the amount of the forces occurring and associated surface pressures, wear and undesirable deformations low.

A further development of the invention provides in one embodiment that the support ring torque transmission section has at least one recess, which is shaped and sized for torque transmission and to receive at least in part a torque transmission body. Alternatively, it is possible that the support ring torque transmission section has at least one projection for torque transmission to interact with a corresponding recess on a torque transmission body. It is thereby possible that the support ring and the torque transmission body are in reciprocal positive engagement. The support ring and the torque transmission body can engage in one another in the axial direction or in the radial direction.

Furthermore, it can be provided according to the invention that the torque transmission body is provided with a freewheel via which it can be connected to the hub body in a directionally selective torque transmitting manner. It also applies here that the torque transmission body is specifically embodied for torque transmission. It is not necessary in this context to take into consideration the transverse forces occurring, as is necessary for a driver according to the prior art, particularly not in the region in which the freewheel is arranged. The term directionally selective means that a rotation in the drive direction causes a torque transmission and in the opposite direction provides a freewheel.

A further development of the invention provides that the bearing section is embodied to accommodate a bearing, in particular an antifriction bearing. However, it is also possible that the bearing section is embodied to accommodate a bearing ring, to which a bearing can be attached. In other words, the bearing section does not need to directly accommodate a bearing, for instance, an antifriction bearing. This can also be carried out by the interposition of a component such as the bearing ring, which is inserted with a fit into the bearing section.

Furthermore, it can be provided that the bearing ring for fixing the base body to the rear axle can be inserted therein. The bearing ring can serve, for example, as a securing element for the base body to the rear axle.

In this context furthermore a connecting pipe can be provided that extends from the support ring to the base body. This connecting pipe can be under tension in particular in that the bearing ring can be screwed via a threaded formation to a mating thread formation of the connecting ring. The connecting pipe with this construction can thus be used as a tension body in order to brace the arrangement axially. It is connected at one end to the support ring or is shaped thereon and at the other end serves, for example, to attach the support ring via the threaded formation and the mating thread formation, which can be screwed into one another more or less forcefully, as needed.

Furthermore, in this context it can be provided that the support ring is provided with a counteraction section, which can be brought into engagement with the torque transmission section for torque transmission. This means that the support ring can be embodied specifically as a torque transmission body, which absorbs the torque from the support ring and transmits it to the one-way clutch.

According to the invention it is furthermore possible that the base body is embodied conically and on its outer circumference has a part of the plurality of sprockets. It can be provided thereby that the base body is embodied in one piece or is composed of a plurality of components firmly connected to one another. In this context it is also possible that the support ring is pressed, screwed or adhered to the base body. This results in an assembly ready for mounting, which is designed according to the load.

The large-diameter support ring can thus be embodied in a relatively stable manner. The sections of the base body that are loaded less, which have sprockets with smaller diameter, can be embodied correspondingly thinner and thus also lighter. In this context it can be provided that at least one sprocket of the plurality of sprockets is arranged on the support ring. Additionally or alternatively it is possible that the support ring is embodied for the attachment of at least one further sprocket. As indicated above, the sprockets close to the support ring are sized with a larger diameter.

The invention further relates to a rear wheel arrangement for a bicycle with a rear axle, which is configured for attachment to a bicycle frame, a hub body supported in a rotatable manner on the rear axle, a multiple sprocket assembly interacting with a drive chain according to one of the embodiments set out herein, and a torque transmission section for the directionally selective transmission of a torque from the multiple sprocket assembly to the hub body in order to drive the hub body, wherein the multiple sprocket assembly is rotatably supported on the rear axle and wherein the torque transmission to the torque transmission assembly is embodied spatially separate from the pivoting or bearing sections.

BRIEF DESCRIPTION OF THE DRAWINGS

The invention is explained by way of example below based on the attached figures.

FIG. 3 is the multiple sprocket assembly according to FIG. 1 in a detail representation;

FIG. 4 is the multiple sprocket assembly according to FIG. 2 in a detail representation;

DETAILED DESCRIPTION OF A PREFERRED EMBODIMENT

Figure 1:
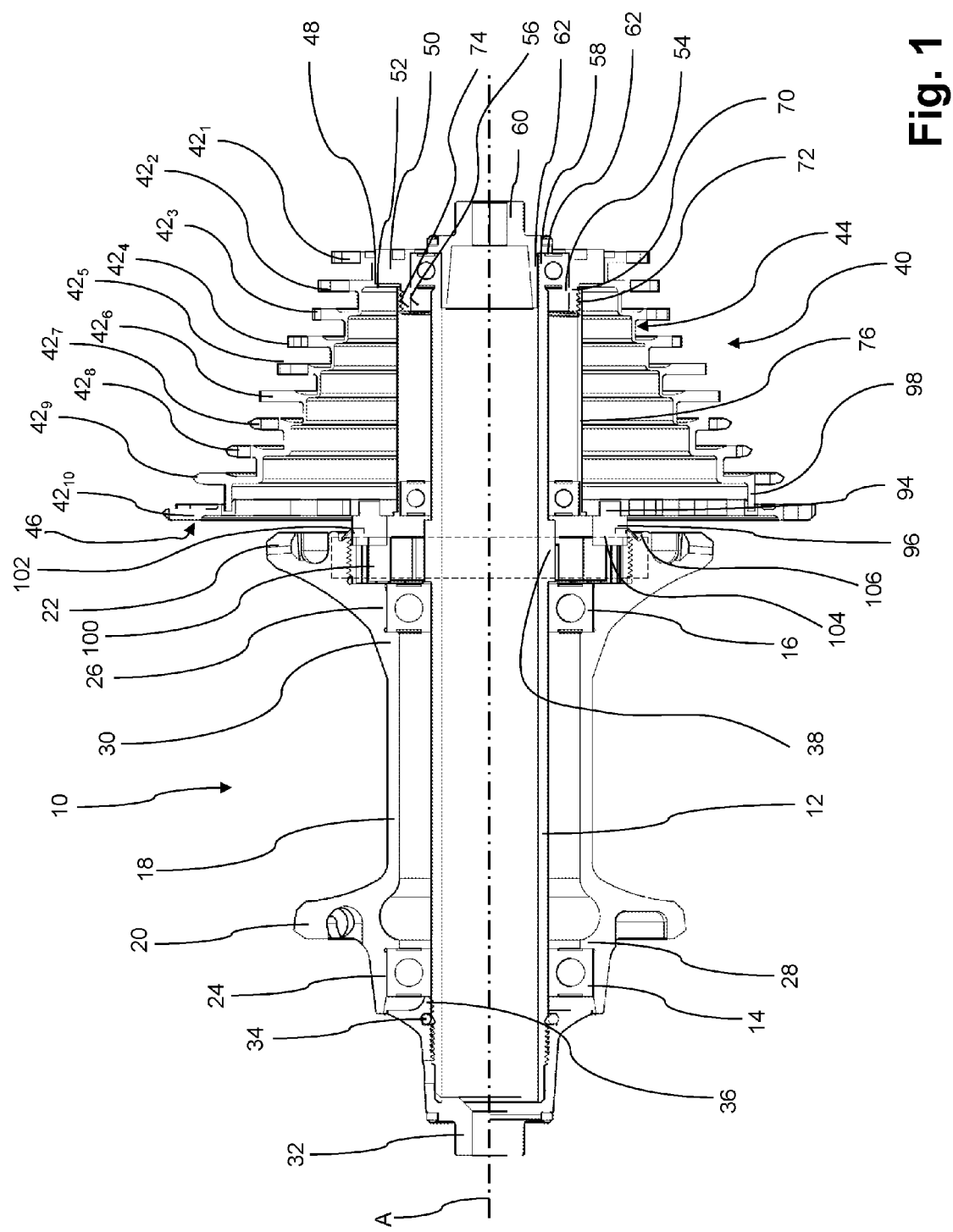
FIG. 1 is an axle in a sectional view of a first embodiment variant of a rear axle assembly according to the invention with a multiple sprocket assembly according to the invention.
Figure 2:
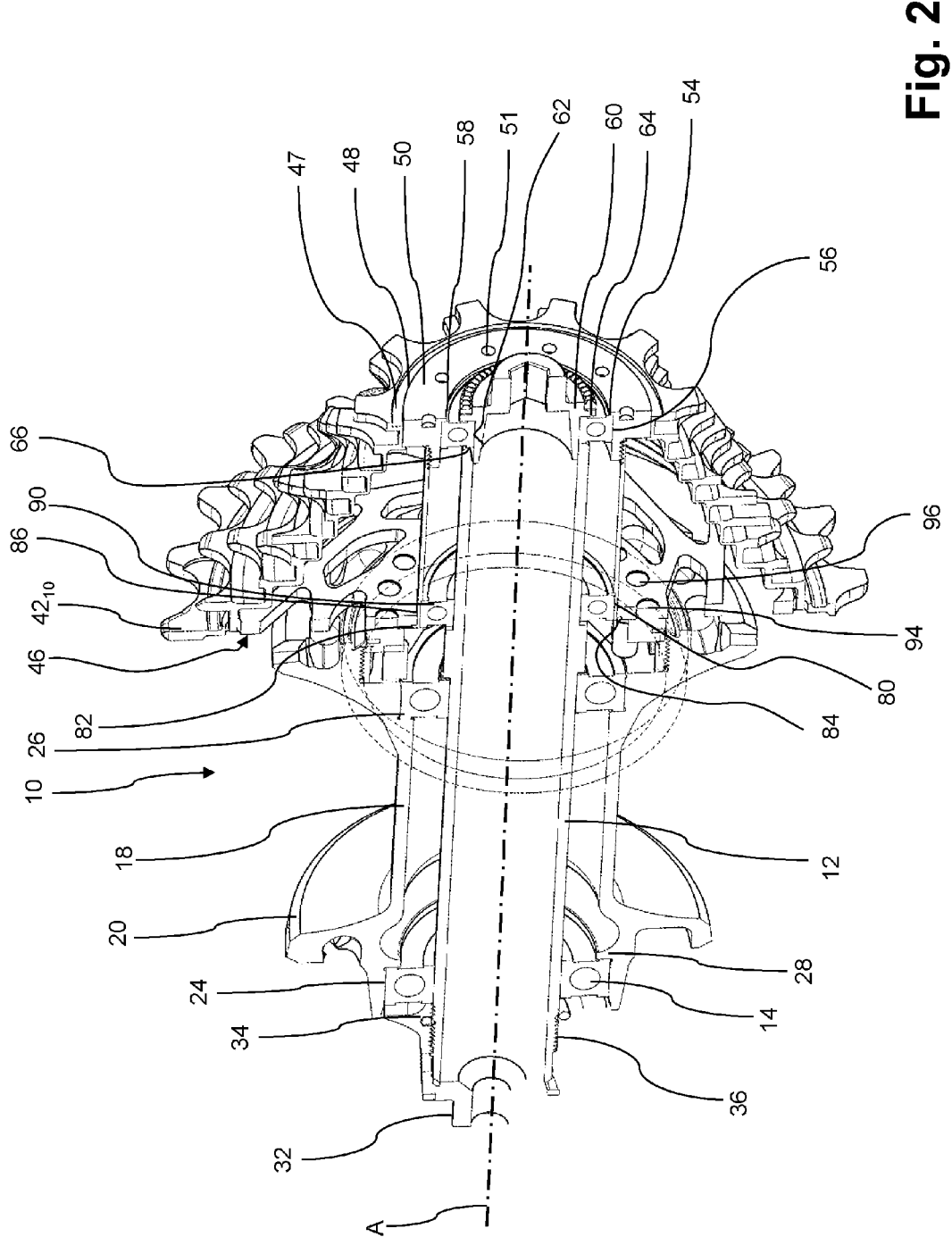
FIG. 2 is the view according to FIG. 1 in perspective representation.

In FIGS. 1 and 2 a rear axle assembly according to the invention for a bicycle is shown in section and labeled in general by 10. This assembly has a rear axle body 12, which extends along a longitudinal axis A. The rear axle body 12 can be connected to the bicycle frame in a known manner (not shown). A hub body 18 is rotatably supported on the rear axle body 12 via two (or more) antifriction bearings 14, 16. The hub body 18 has two flange sections 20, 22, which can be attached for torque transmitting connection to a rim, (not shown).

The bearings 14, 16 are accommodated in respective bearing recesses 24, 26 and bear with their radially outer bearing rings for positioning against collars 28, 30, standing radially inwards, of the hub body 18. In FIG. 1 on the left, a sealing nut 32 with a sealing element 34 is screwed onto the axle body 12. This sealing nut 32 has a washer face 36, which positions the radially inner bearing ring of the antifriction bearing 14 on the axle body 12. The other bearing 16 is positioned via a radial projection 38 on its radially inner bearing ring.

A multiple sprocket assembly 40 is attached near to the right hub flange 22. In the exemplary embodiment shown, the assembly has ten sprockets, which extend from right to left in increasing size. The sprockets are labeled with the reference numbers $42_1$ through $42_{10}$. The sprocket assembly 40 has a base body 44, which has the individual sprockets $42_1$ through $42_9$. The base body 44 is firmly connected to a support ring 46, on the radially outer circumference of which teeth are embodied for embodying the sprocket $42_{10}$ with the largest diameter.

The base body 44 has a structure stepped in a conical manner, as can be seen well in the sectional representation according to FIG. 1.

On its right end in FIG. 1 the base body 44 is provided inside a reinforced ring section 47 (FIG. 2) with a seat recess 48. This ring section 47 with the recess 48 serves as a bearing section in which a bearing ring 50 is accommodated. The bearing ring 50, as can be seen in FIG. 2, has recesses 51 embodied at regular intervals in the circumferential direction, into which a mounting tool can engage. This bearing ring 50 is accommodated with a fit essentially free from play in the seat recess 48 so that the base body 44 with its right end in FIG. 1 is supported on this bearing ring 50. The axial position of the bearing ring 50 relative to the base body 44 is preset by a collar 52 projecting radially inwards and shaped on the base body 44. In other words, the bearing ring 50 cannot be displaced relative to the base body 44 in the axial direction beyond this collar 52.

The bearing ring 50 in turn has a collar 54 projecting radially inwards, which runs essentially orthogonally to a circumferential surface 56 directed radially inwards. The collar 54 and the circumferential surface 56 form a seat area for a further antifriction bearing 58, with which the right end in FIG. 1 of the base body 44 is supported on the axle body 12 with the placement of the bearing ring 50. For this a support nut 60 is provided, which can be screwed or pressed into the axle body 12, and which on its radially outer circumference bears a bearing surface 62 on which the bearing 58 is supported free from play. The support nut 60 also has a collar 64 directed radially outwards, which prevents the bearing 58 from slipping in the axial direction. At the other axial end of the bearing 58, the bearing is supported on the front face 66 of the axle body 12.

It is further discernible in FIGS. 1 through 4 that the bearing ring 50 has an axial face 70. This is provided on its outer circumferential surface with an external thread formation 72. This external thread formation 72 is screwed with an internal thread 74 of a connecting pipe 76. The connecting pipe 76 is inserted with a fit free from play into a radially inner region of the support ring 46 serving as a bearing section, with an opening 80. It is noticeable here that the support ring 46 has a graduated bore 82, which serves to accommodate a flange section 84 with widened diameter on the left end in FIGS. 1 and 2 of the connecting pipe 76. A seat section 86 with slightly enlarged diameter is provided on the inner circumferential surface of the connecting pipe 76 on its left end in FIGS. 1 and 2, into which seat section a further antifriction bearing 90 is inserted with a fit free from play. Via this antifriction bearing 90 the support ring 46 is supported with placement of the left connecting pipe section in FIG. 2 on the axle body 12.

In FIGS. 1 through 4 it can further be seen that the support ring 46 in its radially inner region but spaced apart from the bearing surface 80 is provided with a plurality of circular recesses or openings 92 running in the circumferential direction at regular intervals. These openings serve to accommodate pin-like projections 94, which are arranged on a torque transmission body 96. The pin-like projections 94 are accommodated positively and essentially free from play in the recesses 92. The torque transmission body 96 is then used in turn as an interface to a one-way clutch, which is located in the region 100 of a radially inner recess in the larger-diameter spoke attachment flange 22 of the hub body 18. Furthermore, in the figures a sealing ring 102 can be seen, which is attached to the torque transmitting body 96 in that it is inserted into a circumferential groove 104. This sealing ring 102 slides in a sealing manner on a sealing surface 106 running in a conical manner which is embodied in the shape of a recess on the hub body 18.

It should be added that in this embodiment variant to save weight a plurality of openings 108, 109 is provided in the support ring 46.

For the assembly of the arrangement according to the invention, firstly the hub body 18 is placed in a manner known per se from the left onto the axle body 12 with the bearings 14 and 16 and braced via the nut 32. From the right the assembly, comprising support ring 46, base body 40, inserted connecting pipe 76 as well as bearing 90 together with the torque transmission body 96 and the one-way clutch, not shown in detail, is inserted in the region 100. Thereupon the bearing ring 50 with its external thread 72 is screwed into the internal thread formation 74 of the connecting pipe 76 and braced sufficiently. The bearing 58 is thus positioned. Finally, the support nut 60 is attached in the interior of the hub body 12.

The invention has the advantage that the support ring 46 with its large-diameter, highly mechanically stressed sprocket $42_{10}$ can be embodied in a relatively stable manner. In other words, the support ring 46 can be embodied in a correspondingly stable manner as the component on which the largest torque loads occur due to the lever arm. The remaining sprockets $42_1$ through $42_9$ of the base body 44 can be embodied accordingly thinner and thus in a more favorable manner with respect to saving weight. The support ring 46 is pressed, adhered or otherwise connected to the base body in a manner known per se via projecting pins 98.

The transverse forces produced on the individual sprockets $42_1$ through $42_{10}$ due to the power transmission via the drive chain can be transmitted directly from the multiple sprocket assembly 40 to the axle body 12 via the two bearings 58 and 90. In other words, the multiple sprocket assembly 40 is supported on the axle body 12, as it were, via an individual bearing arrangement, which has the two antifriction bearings 58 and 90. The torque transmission from the multiple sprocket assembly 40 to the hub body 18 and thus the power flow necessary for torque transmission takes place independently of this bearing arrangement. The recesses 92 and the projections 94, engaging therein, of the torque transmission body 96 are provided for this purpose and may be considered to embody at least in part a torque transmission section. In this embodiment variant the torque transmission body 96 can be optimized solely with regard to the torque transmission. The torque transmission takes place spatially independently of the transverse forces occurring on the multiple sprocket assembly 40.

Figure 5:
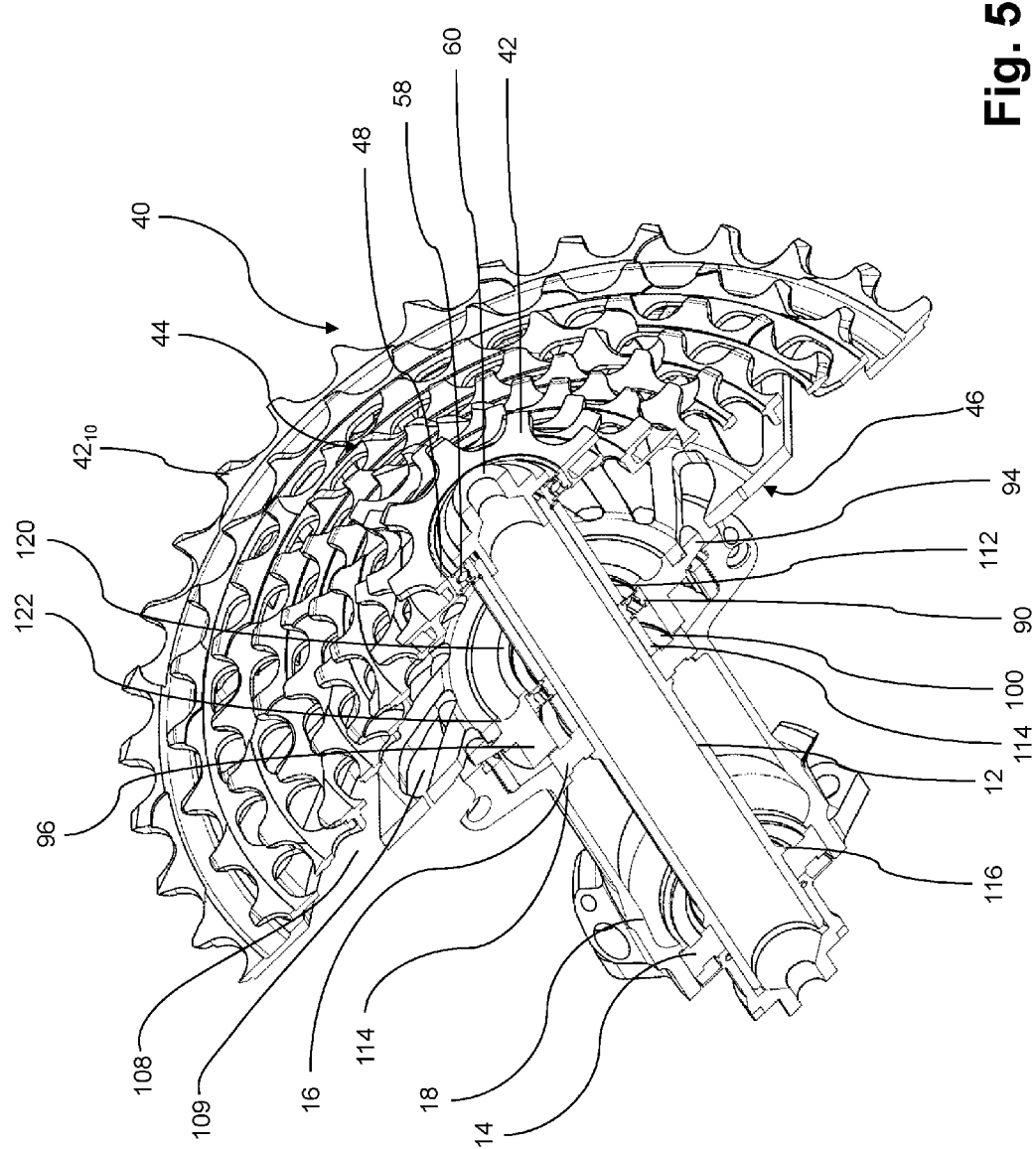
FIG. 5 is a perspective view of a second embodiment of the invention.
Figure 6:
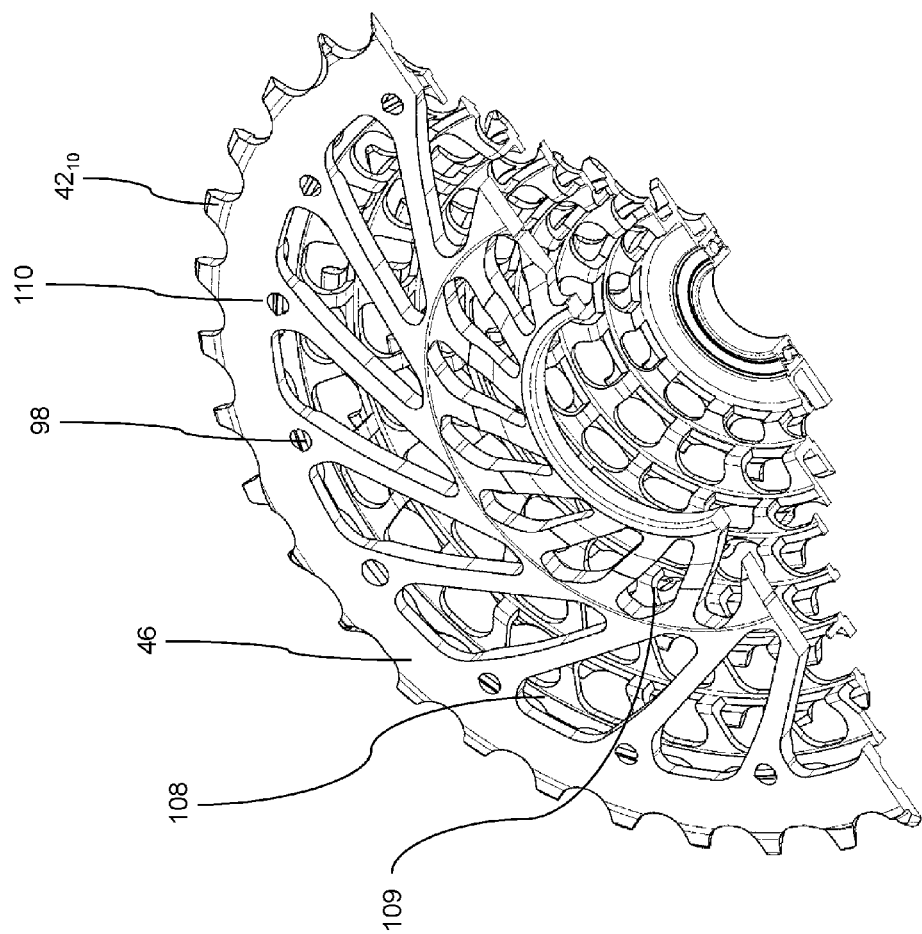
FIG. 6 is the multiple sprocket assembly of the second embodiment of the invention in sectional perspective representation.
Figure 7:
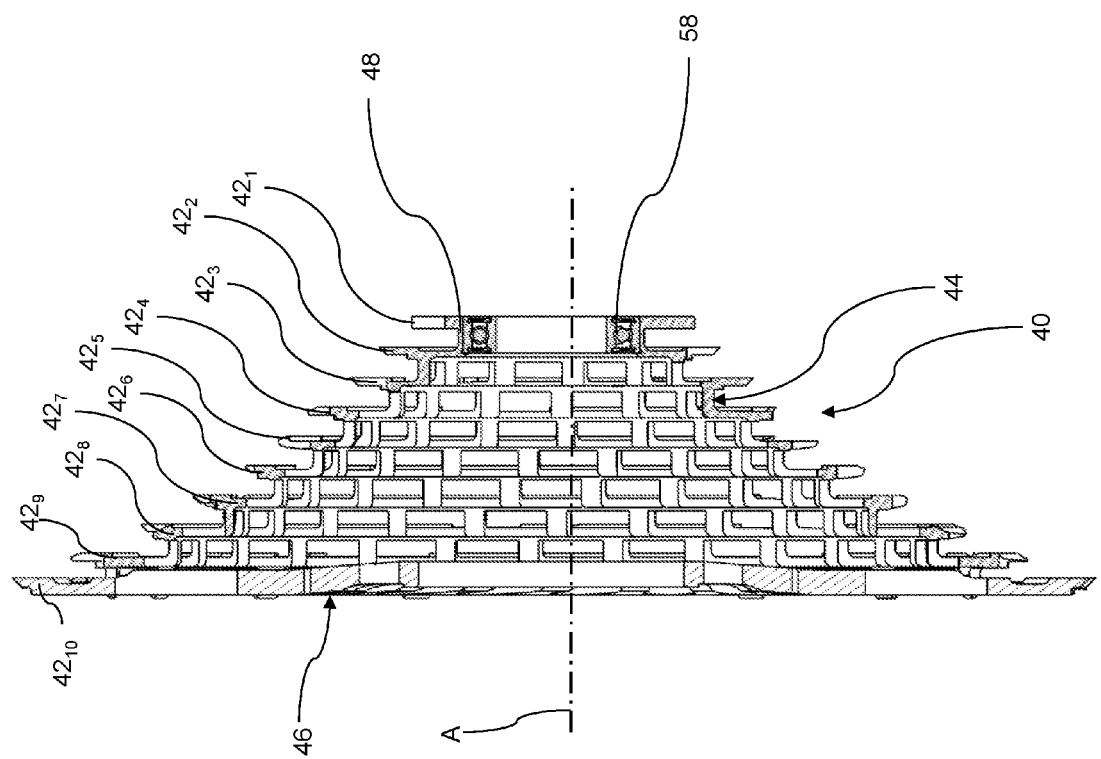
FIG. 7 is the multiple sprocket arrangement according to FIG. 6 in sectional representation.

FIGS. 5 through 7 show a second embodiment of the invention. For the description of this embodiment of the invention, for identical components or components with the same action the same reference numbers are used as in the description of the first embodiment according to FIGS. 1 through 4.

This embodiment of the invention manages without a connecting pipe. It can be seen in particular in FIG. 5 that in turn the base body 44 is embodied essentially in one piece with the sprockets $42_1$ through $42_9$ and is connected in a manner known per se to the support body 46 and sprocket $42_{10}$ embodied on the outer circumference thereof. FIG. 6 shows how to this end the pins 98 engage in corresponding recesses 110 and are firmly pressed thereto. The base body 44 has on its right end in the figures in turn a seat section 48. Deviating from the embodiment according to FIGS. 1 through 4, however, an additional bearing ring is not accommodated, but directly the right antifriction bearing 58. It is thus possible to embody the small sprockets $42_1, 42_2, \ldots 42_9$ of this multiple sprocket assembly 40 still smaller and with even fewer teeth than with the embodiment according to FIGS. 1 through 4 and in particular than in the embodiments according to the prior art.

In the embodiment shown, the smallest sprocket $42_1$ has only nine teeth. The attachment of the bearing 58 on the axial body 12 is similar to the embodiment according to FIGS. 1 through 4. In turn a support nut 60 serves to hold the bearing 58 on the axle body 12. Furthermore, a positioning sleeve 112 can be seen. This is attached essentially free from play on the outer circumference of the axle body 12 and determines an axial distance between the bearing 58 and the second antifriction bearing 90. A further positioning sleeve 114 is arranged between the antifriction bearing 16 for supporting the hub body 18 and the second antifriction bearing 90. In this embodiment variant, the bearing 16 is supported on the axle body 12 on a shoulder 114. The bearing 14 is supported on the axle body on a further shoulder 116.

A consideration of the torque transmission shows that also in this embodiment variant a plurality of openings 108, 109 is provided on the support ring 46 to save weight. The radially inner openings 109 are drawn further radially inwards than with the first embodiment variant and the radially inner section serves to accommodate the projections 94 of the torque transmission body 96. In this embodiment variant, however, the torque transmission body 96 in addition to its function as an interface for the one-way clutch (not shown in detail) in the space 100 is also embodied with a section as bearing ring. To this end the torque transmission body 96 has radially inside the projections 94 an axial face 120, the circumferential surface 122 of which serves to accommodate the inner circumferential surface of the support ring 46 essentially free from play with a corresponding fit and to support it. In the interior of the torque transmission body 96, the bearing 90 is accommodated with a fit essentially free from play. On the torque transmission body 96 furthermore an axial flange 124 is provided, which is used for the positioning of the bearing 90 in the axial direction to the right in FIG. 5.

The difference of the second embodiment according to FIGS. 5 and 7 from the first embodiment is therefore that the connecting pipe 76 was omitted and that in the region of the small sprockets the bearing takes place without the interposition of a bearing ring, so that even smaller sprockets can be used. In the region of the support ring, however, an additional bearing ring 120 is provided, which is used to transmit the bearing forces from the support ring to the bearing 90.

In turn, however, the advantages already described result of a greater freedom in the selection of the sprocket diameters, a much better power flow and a spatial separation of transverse force and force necessary for torque transmission. This also applies to the second embodiment variant, because there the torque transmission body 96 is embodied with different functional sections, namely the projections 94 for torque transmission to the one-way clutch on the one hand and the axial face 120 embodied radially inwards therefrom and spatially separated for the transverse force (bearing force) transmission.

The main advantage of all of the embodiments of the invention lies in that only torques are transmitted via the torque transmission body 96 to the one-way clutch, and the transverse forces are already dissipated via the separate bearing arrangement 58 and 90 independently thereof. Transverse forces, which occur in particular with an oblique position of the chain and exert a particularly marked stress on the components involved, can thus be factored out of the torque transmission.

In addition it should be noted that the various principles of the two exemplary embodiments according to FIGS. 1 through 7 can also be exchanged among one another. For instance, it is possible to use a torque transmission body 96, as is used in the exemplary embodiment according to FIG. 5, in the embodiment variant according to FIG. 1. It is likewise possible, omitting the bearing ring 50, to arrange a bearing arrangement for accommodating the bearing 58 according to FIG. 5 in the embodiment according to FIG. 1. The advantages associated with the respective construction can be achieved hereby.

While this invention has been described by reference to a particular embodiment, it should be understood that numerous changes could be made within the spirit and scope of the inventive concepts described. Accordingly, it is intended that the invention not be limited to the disclosed embodiment, but that it have the full scope permitted by the language of the following claims.

The invention claimed is:

1. A multiple sprocket assembly with a plurality of sprockets with different numbers of teeth for assembly on a rear axle of a bicycle, comprising:
    a base body, on which at least some of the plurality of sprockets is provided; and
    a support ring that is connectable to the base body in a torque-transmitting manner, wherein the base body and the support ring include on their radially inner regions respectively radial inner bearing sections, at least one of the bearing sections being configured to accommodate a bearing for rotatable bearing on the rear axle of the bicycle, and the support ring includes a torque transmission section separate from the bearing section for transmitting a torque from the multiple sprocket assembly to a hub body disposed on the axle.

2. The multiple sprocket assembly according to claim 1, wherein the torque transmission section is positioned radially outside the bearing section.

3. The multiple sprocket assembly according to claim 1, wherein the support ring torque transmission section has at least one recess, which is configured for torque transmission and to receive at least in part a torque transmission body.

4. The multiple sprocket assembly according to claim 3, wherein the support ring and the torque transmission body are in reciprocal positive engagement.

5. The multiple sprocket assembly according to claim 3, wherein the torque transmission body is provided with or is connectable to a one-way clutch for connection of the multiple sprocket assembly to the hub body in a directionally selective torque transmitting manner.

6. The multiple sprocket assembly according to claim 1, wherein the support ring has at least one projection, which is configured for torque transmission to interact with a corresponding recess on a torque transmission body.

7. The multiple sprocket assembly according to claim 6, wherein the support ring and the torque transmission body are in reciprocal positive engagement.

8. The multiple sprocket assembly according to claim 1, wherein one of the bearing sections is shaped to accommodate a bearing ring on which a bearing can be placed.

9. The multiple sprocket assembly according to claim 8, wherein the bearing ring fixes the base body to the rear axle.

10. The multiple sprocket assembly according to claim 8, further including a connecting pipe which extends from the support ring to the base body.

11. The multiple sprocket assembly according to claim 10, wherein the connecting pipe is under tension.

12. The multiple sprocket assembly according to claim 10, wherein the bearing ring is threadably connectable to the connecting pipe.

13. The multiple sprocket assembly according to claim 1, wherein the base body is conical and on it outer circumference at least some of the plurality of sprockets is formed.

14. The multiple sprocket assembly according to claim 1, wherein the base body is a one-piece construction.

15. The multiple sprocket assembly according to claim 1, wherein the support ring is one of press-fit, screwed and glued to the base body.

16. The multiple sprocket assembly according to claim 1, wherein at least one sprocket of the plurality of sprockets is arranged on the support ring.

17. The multiple sprocket assembly according to claim 1, wherein the support ring is configured for the attachment of at least one further sprocket.

18. A rear axle assembly for a bicycle with a rear axle, which is attachable to a bicycle frame, comprising:
    a hub body supported in a rotatable manner on the rear axle; and
    a multiple sprocket assembly for use with a drive chain, the multiple sprocket assembly including a torque transmission section transmitting a torque from the multiple sprocket assembly to the hub body through a one-way clutch in order to drive the hub body, and radially inner bearing sections, at least one of the bearing sections being configured to accommodate a bearing for rotatably supporting the multiple sprocket assembly on the rear axle and wherein torque transmission to the torque transmission section is spatially separate from the radially inner bearing section to transmit torque to the hub body independently of the radially inner bearing section.

* * * * *